United States Patent
Olthoff

(10) Patent No.: US 9,371,817 B2
(45) Date of Patent: Jun. 21, 2016

(54) REMOVABLE ROTOR BLADE TIP

(75) Inventor: Gerhard Olthoff, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 658 days.

(21) Appl. No.: 13/821,227

(22) PCT Filed: Sep. 1, 2011

(86) PCT No.: PCT/EP2011/065116
§ 371 (c)(1),
(2), (4) Date: May 24, 2013

(87) PCT Pub. No.: WO2012/031976
PCT Pub. Date: Mar. 15, 2012

(65) Prior Publication Data
US 2013/0236321 A1   Sep. 12, 2013

(30) Foreign Application Priority Data
Sep. 10, 2010 (DE) .......................... 10 2010 040 596

(51) Int. Cl.
*F03D 1/06* (2006.01)

(52) U.S. Cl.
CPC .............. *F03D 1/0675* (2013.01); *F03D 1/065* (2013.01); *F05B 2240/302* (2013.01); *Y02E 10/721* (2013.01); *Y02P 70/523* (2015.11)

(58) Field of Classification Search
CPC ... F03D 1/065; F03D 1/0675; F03D 11/0033; F05B 2240/302; Y02E 10/721
See application file for complete search history.

(56) References Cited

U.S. PATENT DOCUMENTS

| | | | | |
|---|---|---|---|---|
| 8,221,085 B2* | 7/2012 | Livingston | .............. | B29C 65/54 156/291 |
| 8,328,516 B2* | 12/2012 | Santiago | .............. | F03D 1/0675 244/199.1 |
| 8,342,805 B2* | 1/2013 | Mendez Hernandez | .............. | F01D 11/00 244/1 A |
| 2007/0018049 A1* | 1/2007 | Stuhr | .............. | B64C 23/065 244/124 |
| 2008/0145231 A1* | 6/2008 | Llorente Gonzales | .............. | F03D 1/0675 416/243 |
| 2009/0116962 A1* | 5/2009 | Pedersen | .............. | F03D 1/0675 416/31 |
| 2009/0139739 A1* | 6/2009 | Hansen | .............. | F03D 11/0033 174/2 |
| 2009/0257885 A1 | 10/2009 | Godsk et al. | | |
| 2011/0020126 A1* | 1/2011 | Glenn | .............. | F03D 1/0675 416/223 A |
| 2011/0081247 A1* | 4/2011 | Hibbard | .............. | F03D 1/0675 416/226 |
| 2011/0081248 A1* | 4/2011 | Hibbard | .............. | F03D 1/0675 416/226 |
| 2013/0064675 A1 | 3/2013 | Jaquemotte | | |

FOREIGN PATENT DOCUMENTS

| | | |
|---|---|---|
| CL | 2004001586 A1 | 4/2005 |
| CL | 2012002488 A1 | 6/2013 |
| DE | 103 00 284 A1 | 7/2004 |

(Continued)

*Primary Examiner* — Igor Kershteyn
(74) *Attorney, Agent, or Firm* — Seed Intellectual Property Law Group PLLC

(57) ABSTRACT

One or more embodiments are directed to a rotor blade tip for a rotor blade, in particular for a rotor blade of a wind power installation, which is in the form of an independent portion which can be connected to the rotor blade and has a first connecting surface directed in the direction of the rotor blade to be connected. For making the connection to the rotor blade provided at the connecting surface are first guide element with a guide direction when making the connection to the rotor blade and first locking element for fixing the rotor blade tip to the rotor blade as first component parts of a connecting mechanism.

15 Claims, 5 Drawing Sheets

(56) References Cited

FOREIGN PATENT DOCUMENTS

| | | |
|---|---|---|
| DE | 103 19 246 A1 | 12/2004 |
| DE | 10 2006 022 279 A1 | 11/2007 |
| DE | 10 2008 007 910 A1 | 8/2008 |
| DE | 10 2008 055 580 A1 | 7/2009 |
| EP | 1 184 566 A1 | 3/2002 |
| EP | 2 305 999 A2 | 4/2011 |
| EP | 2 317 124 A2 | 5/2011 |
| EP | 2 320 075 A2 | 5/2011 |
| JP | 2006-152957 A | 6/2006 |
| JP | 2006-183598 A | 7/2006 |
| WO | 01/46582 A2 | 6/2001 |
| WO | 2004/097215 A1 | 11/2004 |
| WO | 2005/031158 A2 | 4/2005 |
| WO | 2008/052677 A2 | 5/2008 |
| WO | 2009/135902 A2 | 11/2009 |
| WO | 2010/023299 A2 | 3/2010 |

\* cited by examiner

REMOVABLE ROTOR BLADE TIP

BACKGROUND

1. Technical Field

The invention concerns a removable rotor blade tip for a rotor blade, in particular for a rotor blade of a wind power installation, a rotor blade having a rotor blade tip according to the invention and a wind power installation with rotor blades or rotor blade tips according to the invention.

2. Description of the Related Art

Rotor blades and rotor blade tips are basically known in the state of the art. In particular curved rotor blade tips have already long been known for example in relation to rotor blades from the manufacturer Enercon. Those known rotor blade tips, which are also briefly referred to as tips, reduce the edge turbulence which inevitably occurs at the end of the rotor blade in operation, and thus unwanted sound emissions.

For technical information attention is directed at this juncture generally and by way of example to DE 103 19 246 A1, DE 10 2006 022 279 A1 and DE 103 00 284.

Rotor blade tips angled in that way however represent a very delicate component part of the rotor blade precisely when transporting the rotor blades to the place of erection of the wind power installation. Handling rotor blades with angled rotor blade tips is also difficult in manufacture of a rotor blade—for example during the painting process.

BRIEF SUMMARY

One or more embodiments of the present invention is directed to a solution for simplifying handling and/or transport of rotor blades.

In one embodiment, the rotor blade tip makes it possible for rotor blades to be produced without a rotor blade tip, so that they can thus be more easily handled. In addition such rotor blades may be less susceptible to being damaged when being transported to the wind power installation. Finally, in the case of a rotor blade according to the invention, the rotor blade tip can be easily changed on site upon suffering damage in operation.

A rotor blade tip, in particular for a rotor blade of a wind power installation, in one embodiment, is in the form of an independent portion which can be connected to the rotor blade. The rotor blade tip has a first connecting surface which is directed in the direction of the rotor blade to be connected and includes at least one guide element and at least one locking element as first components of a connecting mechanism for connection to a correspondingly designed rotor blade.

To make the connection to the rotor blade, provided at the connecting surface are first guide means having a guide direction, which guide the rotor blade tip when making the connection to the rotor blade in such a way that the connection occurs mechanically reliably and the locking means of the connecting mechanism are correctly positioned without damage relative to each other and can appropriately co-operate. Therefore there are further provided first locking means for fixing the rotor blade tip to the rotor blade for securely fixing the rotor blade tip.

The first guide means can comprise at least one plug element arranged parallel to the guide direction. For example pins or bolts can be provided as plug elements on the rotor blade tip. The plug element can be hollow or solid depending on the respective dimensioning and material involved.

The first locking means on the rotor blade tip can comprise at least a first connecting element, for example a projection, for making a preferably releasable, positively locking connection to second locking means on the rotor blade, that is to say at least one corresponding second connecting element. The at least one first locking element can be arranged centrally on the first connecting surface and can have a connecting surface which is parallel to the guide direction.

In the configuration with a projection as the first connecting element the projection has a projection surface which is parallel to the guide direction, as the connecting surface, in which for example there can be provided at least one opening whose shape is then of a complementary configuration to that of the second connecting element on the rotor blade.

In addition a first securing component, for example an aperture which is preferably perpendicular to the guide direction, for example a bore, can be provided on the first connecting element. A securing element can engage into or through that aperture for securing and preferably actuating the connecting mechanism.

In regard to the shape of the rotor blade tip it is to be noted that it preferably has a rotor blade tip connecting portion having an aerodynamic profile which has a pressure side and a suction side and in which the first components of the connecting mechanism are disposed. The rotor blade tip further has a rotor blade tip end portion which also has an aerodynamic profile having the pressure side and the suction side and in which the rotor blade tip preferably narrows and particularly preferably terminates in the form of an edge arc, particularly preferably with a pointed tip.

The rotor blade tip is preferably of an angled configuration. For that purpose the rotor blade tip end portion is bent out of the plane of the rotor blade tip connecting portion similarly to a winglet, that is to say it is angled. In contrast to the winglets known on aircraft aerofoils, the tip of the rotor blade tip however is angled in the direction of the pressure side. In certain configurations the rotor blade tip portion can be turned in its central plane through between about 4° and 8°, preferably between 4° and 6°, particularly preferably about 5°, about the thread axis of the rotor blade tip.

In order to ensure a predetermined lightening strike location in the event of storms so that the rotor blade tip functions as a lightening conductor it is preferably made from metal. Aluminum is particularly suitable by virtue of its good electrical conductivity and its low specific weight. The rotor blade tip then serves as a lightening conductor and can pass lightening strikes into suitable conductor elements integrated into the rotor blade in order thereby to effectively protect the wind power installation in the case of a lightning strike.

The rotor blade tip can also be hollow. A hollow rotor blade tip can be heated to eliminate or reduce icing, for example it can have a flow of hot air therethrough, from the rotor blade.

A rotor blade according to one embodiment of the invention, in particular for a wind power installation, has a rotor blade body which as is known has an aerodynamic profile having a pressure side and a suction side, between a rotor blade leading edge and a rotor blade trailing edge.

A rotor blade root is disposed at a first end of the rotor blade body and the rotor blade tip according to one embodiment of the invention is at a second end opposite to the first end. Thus in the rotor blade a rotor blade tip is connected with a connecting mechanism. Therefore, for connection to the rotor blade tip on the rotor blade body, there are to be provided the second components of the connecting mechanism, which include second guide means complementary to the first guide means of the rotor blade tip, and second locking means co-operating with the first locking means of the rotor blade tip. A rotor blade is therefore adapted to be connected to the rotor blade tip.

The second guide means, corresponding to the first guide means at the rotor blade tip, can comprise at least one second plug element arranged parallel to the guide direction. For example if the first guide means are in the form of at least one pin or bolt, the second guide means can be in the form of a sleeve which is of dimensions adapted thereto.

The second locking means can include at least one second connecting element, for example a lock member, for making the preferably releasable, positively locking connection to the at least one corresponding first connecting element provided on the rotor blade tip.

If the second connecting element comprises a lock member the lock member can for example be mounted displaceably or rotatably movably to the rotor blade body. In addition stressing means can be provided for prestressing the movable lock member into the locking position.

The lock member has a lock surface which is disposed or oriented parallel to the guide direction in the locking position. Then for example a lock element can be provided on the lock surface, the shape of the lock element being complementary to that of the first connecting element of the rotor blade tip. Thus a positively locking connection can be formed between the first and second locking elements in the locking position. That connection can be released again so that the rotor blade tip can be removed from the rotor blade body if required.

If as referred to hereinbefore the lock member is prestressed into the locking position by suitable stressing device, such as a spring, then the positively locking connection between the locking means is made automatically when the rotor blade tip is connected to the rotor blade body.

To secure the locking mechanism a second securing component, for example an aperture which is preferably perpendicular to the guide direction in the locking position, preferably a screwthreaded bore, can be provided on the lock member, for connection to the at least one securing element.

A positively locking connection made between the first and second locking means in the locking position can be secured by the securing element, by the securing element co-operating together with the first and second securing components and thus holding the positively locking connection in the engaged condition. For example a screw as the securing element for securing the connection can be brought into engagement through the first bore in the projection on the rotor blade tip into the coaxially oriented second bore with screwthread in the lock member and tightened with a predetermined force. If the lock member is prestressed into the locking position, that then automatically ensures that the apertures for the securing element are oriented in mutually coaxial relationship.

The connecting mechanism could also be actuated with the securing element, for example by the second locking means, for example the lock member, being moved by the securing element.

It will be appreciated that other design configurations for securing the positively locking connection are also possible—the measure only has to adequately secure the arrangement of the connecting elements relative to each other, that is to say to exclude unintentional relative movement. At any event the securing element must be designed only so that it can be loaded in such a way that it can hold, that is to say secure, the positively locking connection between the first and second locking elements in the locking position. The centrifugal forces occurring in operation of the wind power installation for example at the rotor blade tip are carried by the first and second locking elements in the locking position and are passed off into the rotor blade and from there into the rotor hub.

Finally it should also be noted that it will be appreciated that the arrangement of the above-described component parts of the connecting mechanism between the rotor blade body and the rotor blade tip could be transposed.

If the rotor blade predominantly comprises glass fiber-reinforced plastic, conductive elements can be integrated into the rotor blade as conducting elements, that is to say lightening conductors, which are then in good electrically conducting contact, that is to say without any transition resistance worth mentioning, with the rotor blade tip—which as mentioned above is preferably made from metal—for example by way of the guide elements. The conductor elements can in turn serve to mechanically anchor the second components of the connecting mechanism in the rotor blade body so that the centrifugal forces occurring in operation can be reliably passed from the rotor blade tip into the rotor blade.

The rotor blade tip or a rotor blade also advantageously permits particularly simple replacement of for example a rotor blade tip which has been damaged in operation by the impact thereagainst of a foreign body. Embodiments of the invention therefore also embraces a wind power installation having a rotor which has at least one rotor blade or at least one rotor blade with a rotor blade tip.

BRIEF DESCRIPTION OF THE SEVERAL VIEWS OF THE DRAWINGS

Further advantageous configurations of the invention and an embodiment by way of example in relation thereto are described in greater detail hereinafter with reference to the accompanying drawings. The terms "left", "right", "up", "down" used in the description of the specific embodiment relate to the Figures of drawings in an orientation with the Figure identifications and references being normally readable.

DETAILED DESCRIPTION

Figure 1:
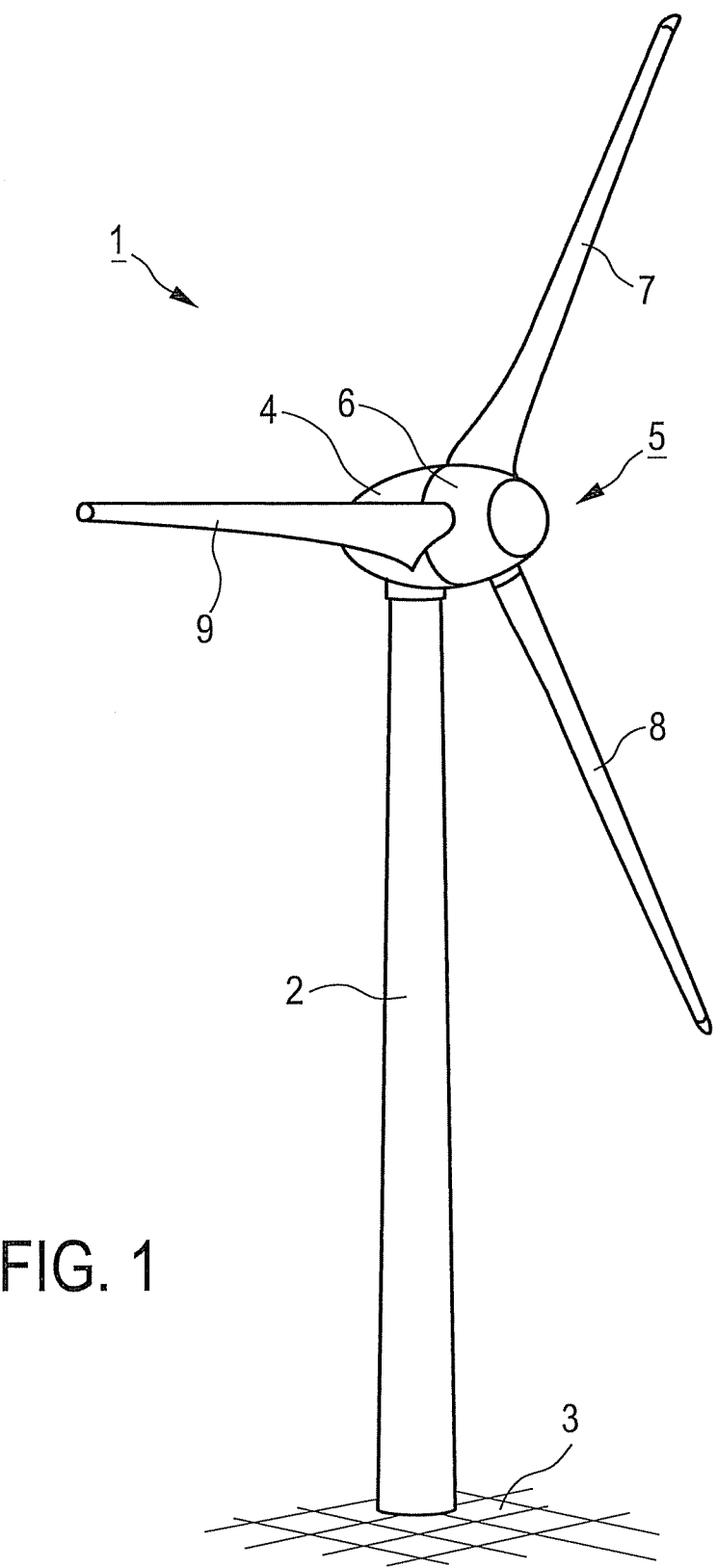
FIG. 1 shows a view of a wind power installation with the essential components.

FIG. 1 shows a wind power installation 1 having a pylon 2 erected on a foundation 3. Disposed at the upper end opposite to the foundation 3 is a pod 4 (machine housing) with a rotor 5 substantially comprising a rotor hub 6 and rotor blades 7, 8 and 9 mounted thereto. The rotor 5 is coupled to an electric generator in the interior of the pod 4 for converting mechanical work into electrical energy. The pod 4 is mounted rotatably on a pylon 2, the foundation 3 of which affords the necessary stability.

Figure 2:
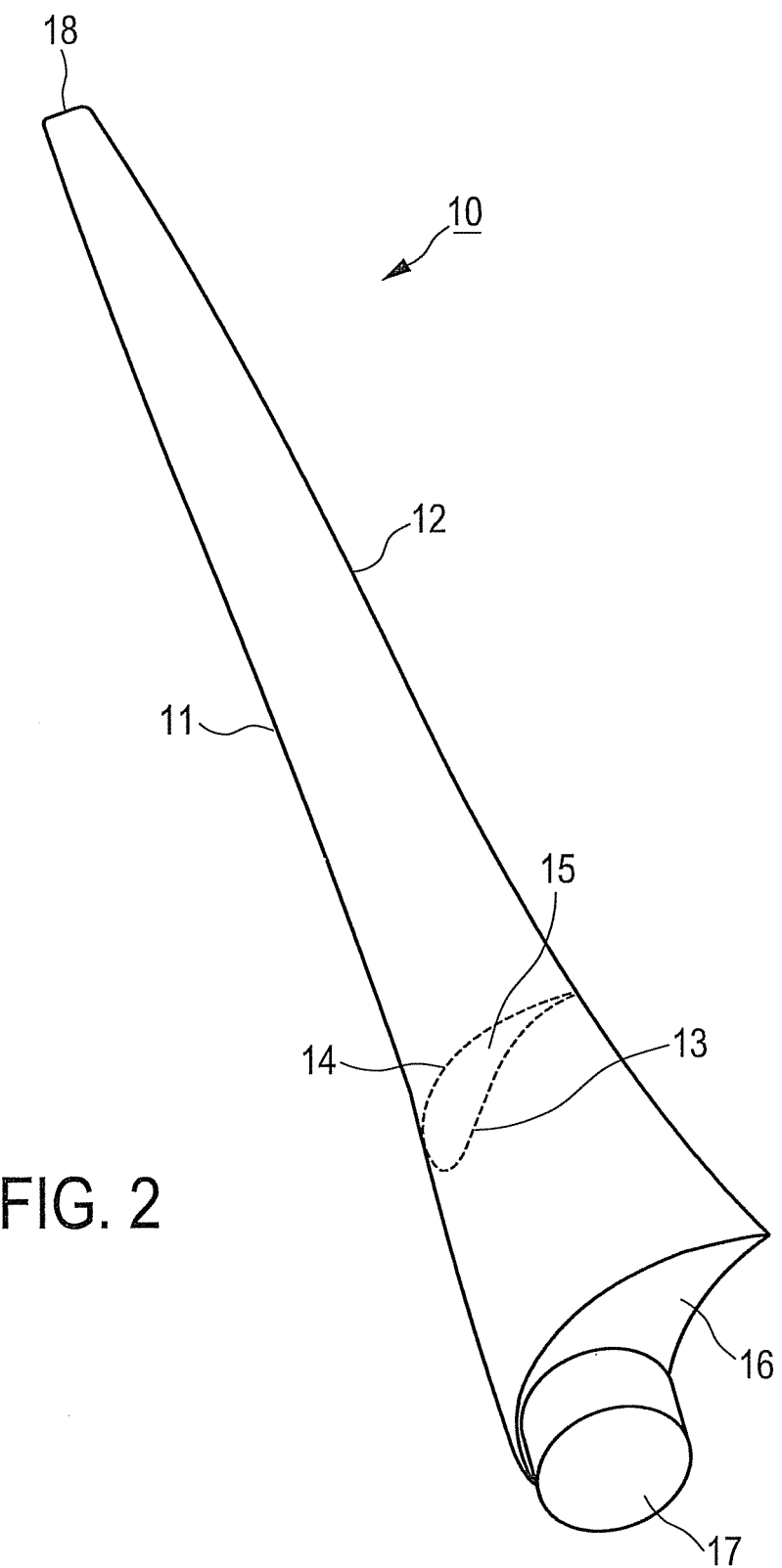
FIG. 2 shows rotor blade with its essential features.

FIG. 2 shows an individual rotor blade 10. The rotor blade 10 can be essentially described by the configuration of the rotor blade leading edge 11 and the rotor blade trailing edge 12 as well as the aerodynamic profile 15 therebetween, which involves a pressure side 13 and a suction side 14. On the illustrated rotor blade, disposed in the region of the end of the rotor blade 10, that in the condition of being mounted to a wind power installation is adjacent to the rotor hub and is referred to as the rotor blade root 16, is a rotor blade connection 17 for mechanical connection to the rotor hub. A rotor blade tip 18 is at the end of the rotor blade 10, that is opposite to the rotor blade root.

Figure 3A:
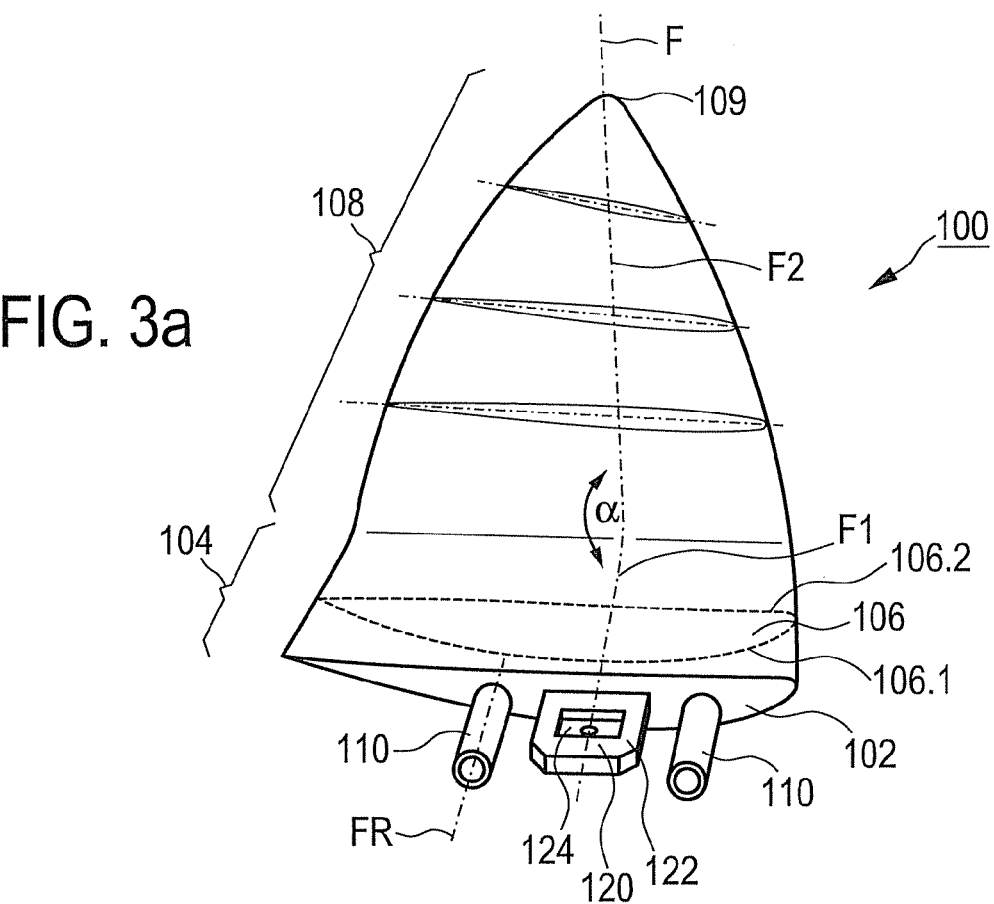
FIG. 3a shows a perspective view of a configuration of a rotor blade tip according to one embodiment of the invention.
Figure 3B:
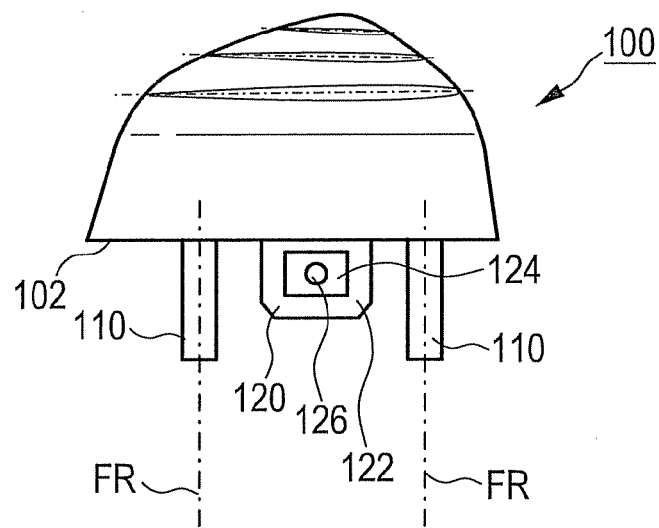
FIG. 3b shows a plan view in the direction of the pressure side onto the rotor blade tip of FIG. 3a, FIG. 4 shows a perspective view of the components of the connecting mechanism on the rotor blade with the direction of view from the rotor blade interior in the direction of the rotor blade tip.

FIGS. 3a and 3b show two different views of a rotor blade tip 100, which is also referred to as a tip portion or edge arc. FIG. 3a shows a perspective view of an embodiment of a rotor blade tip.

The rotor blade tip 100 is an independent portion which can be connected to a rotor blade. Two hollow bolts or pins 110 are provided at a first connecting surface 102 directed in the direction of a rotor blade as a counterpart connection member, for guidance when making the connection to the rotor blade, acting as the first guide element. The arrangement of the pins 110 provides a predetermined guide direction FR when making the connection to the rotor blade.

In addition, a projection 120 is provided as a first connecting element at the rotor blade tip 100 as the first connecting element, for fastening the rotor blade tip 100 to the rotor blade. The projection 120 serves to make a preferably releasable, positively locking connection to at least one corresponding second connecting element provided on the rotor blade.

The first guide element and the first locking element represent first component parts of a connecting mechanism between the rotor blade and the rotor blade tip.

The projection 120 is arranged almost centrally on the first connecting surface 102 and has a projection surface 122 parallel to the guide direction FR. Provided in the projection surface 122 is at least one opening 124 serving to receive a second connecting element on the rotor blade. The shape of the opening 124 is therefore ideally complementary to that of the second connecting element on the rotor blade (see FIG. 6).

Provided in the projection 120 is an aperture which is perpendicular to the guide direction FR, as a first securing component, in the form of a bore 126, through which a securing element (see FIG. 6, 130) can be passed for securing and actuating the connecting mechanism between the rotor blade tip 100 and a rotor blade.

The rotor blade tip 100 can be sub-divided into a rotor blade tip connecting portion 104 having an aerodynamic profile 106 with a pressure side 106.1 and a suction side 106.2, and a rotor blade tip end portion 108 with an aerodynamic profile having the pressure and suction sides. The first component parts of the connecting mechanism are arranged on the rotor blade tip connecting portion 104.

The thread axis F is indicated in the view of the rotor blade tip 100 in FIG. 3. The thread axis F is a notional axis, onto which, when the rotor blade tip 100 is envisaged as being composed of individual, infinitesimally thin portions or slices which are each substantially in the shape of the respective aerodynamically effective profile, all portions are to be threaded so as to afford the desired rotor blade shape.

The edge arc or rotor tip as shown in FIG. 3a is illustrated with three such profile sections as examples. The position of the three different profile sections illustrates a rotation of the profile of the tip about the thread axis F. In that respect the illustrated rotation in terms of magnitude is greater than a practical number of degrees in order to make the view perceptible to some extent at all in the drawing, for reasons of illustration. The rotation can be for example 5 degrees, which represents a good compromise between reduced sound emission and increased loading.

The rotor blade tip 100 narrows in the rotor blade tip end portion 108 and terminates there in the form of an edge arc with a point 109. In relation to the rotor blade plane of the rotor blade tip connecting region 104, the rotor blade tip end region 108 is curved or angled away from the suction side 106.1 of the rotor blade tip connecting region 104, that is to say towards the pressure side 106.2. The rotor blade tip end region 108 of the rotor blade tip 100 is bent at an angle α with respect to a first part F1 of the axis F. A second part F2 of the axis F is illustrated for the rotor blade tip end region 108. Between the two parts F1 and F2 there is an angle α which describes the angled configuration of the rotor blade tip end portion 108. The angle α is preferably between 120° and 90°.

FIG. 3b shows a plan view of the pressure side 106.2 of the rotor blade tip in FIG. 3a.

Figure 4:
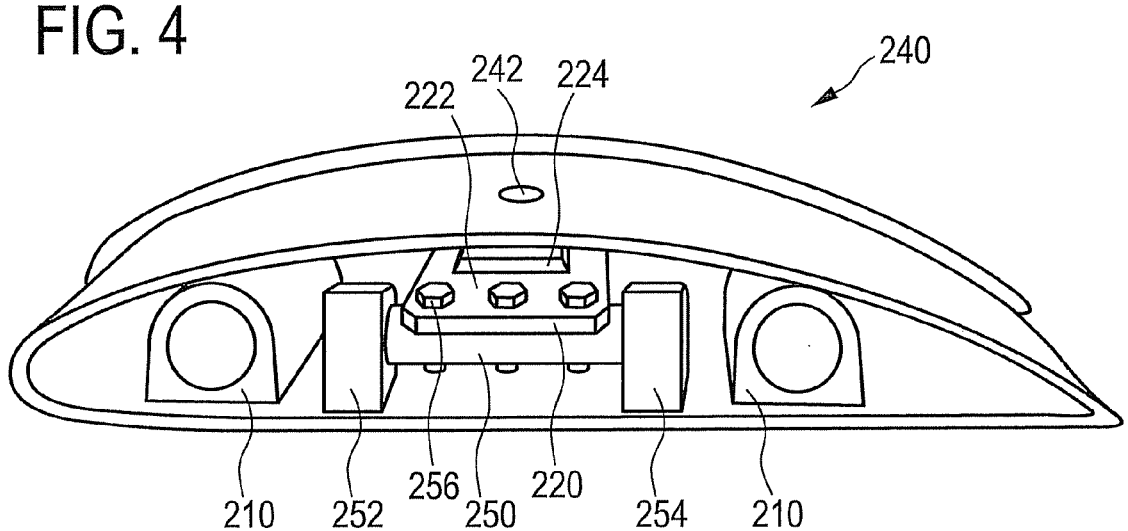

FIG. 4 shows a perspective view of the component parts of the connecting mechanism on the rotor blade body, the direction of view extending from the rotor blade interior in the direction of the rotor blade tip. The component parts of the connecting mechanism, that are at the rotor blade body side, are contained in an insert 240 which, similarly to the rotor blade tip, preferably comprises metal, particularly preferably aluminum. The insert 240 can be integrated in the rotor blade body in manufacture thereof.

To apply the forces occurring in operation of the rotor blade at the connecting mechanism the insert 240 is anchored with tensile elements which extend in the longitudinal direction far into the rotor blade. Ideally the anchoring elements can also be made from an electrically conductive material and thus, besides the anchorage function for making the connection between the rotor blade body and the rotor blade tip, can also perform the lightening conductor function as conductor elements, particularly if the rotor blade tip which is preferably made from metal is to function as a lightening conductor.

Figure 5:
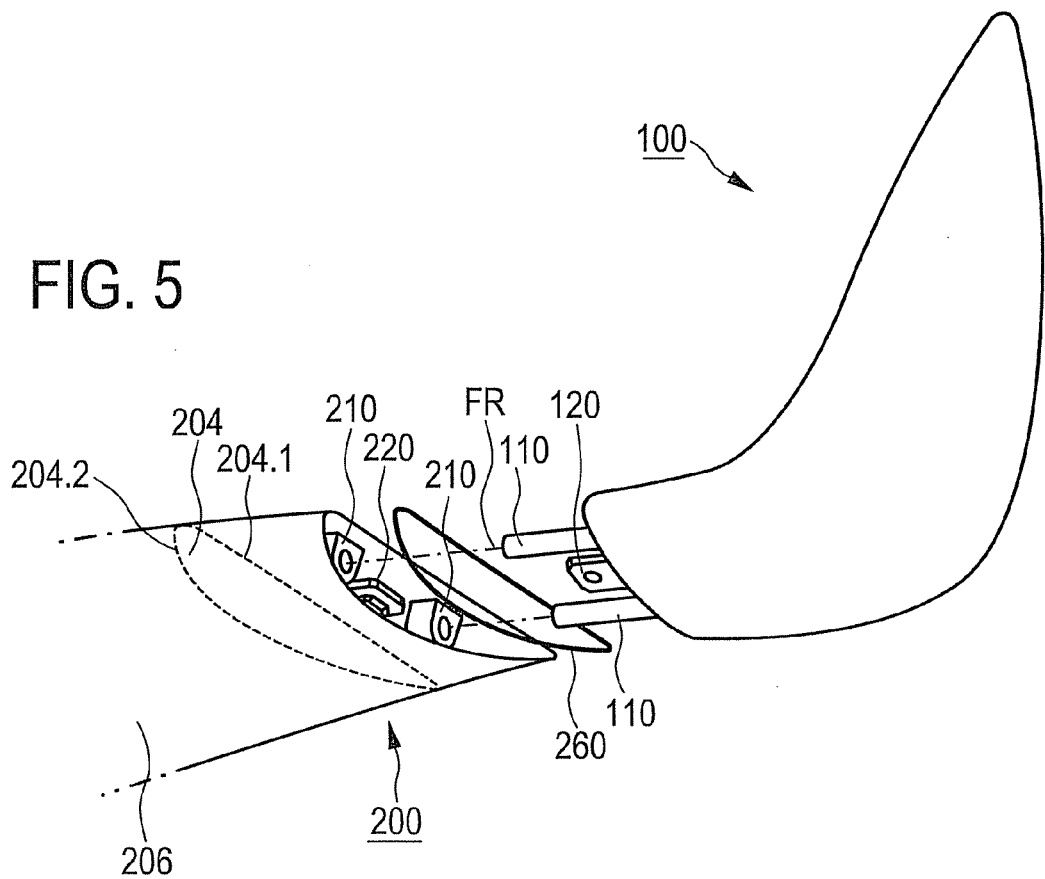
FIG. 5 shows a side view of a perspective view of the rotor blade body and the rotor blade tip.

The second component parts of the connecting mechanism are provided in the insert 240 for the rotor blade body (FIG. 5, 206) for connection to the rotor blade tip. That is to say, disposed in the insert 240 are two sleeves 210 as the second guide elements complementary to the first guide elements (FIG. 5, 110) of the rotor blade tip (FIG. 5, 100). In addition there is a rotatably movable lock member 220 as the second connecting element for producing the releasable, positively locking connection to the at least one corresponding projection (FIG. 5, 120) provided at the rotor blade tip (100), as the first connecting element of the rotor blade tip.

The sleeves 210 as the second guide elements are also arranged parallel to the guide direction FR and ensure that, when making the connection between the rotor blade tip and the rotor blade body, the first and second locking elements are correctly positioned relative to each other for proper functioning of the connecting mechanism.

The lock member 220 is connected to a spindle mounted rotatably in bearings 252, 254 for example with screws 256 or locked bolts and is thus fixed movably to the rotor blade body (FIG. 5, 206). In the locking position the lock member 220 has a locking surface 222 parallel to the guide direction FR. Provided on the lock member 220 is a lock element 224 whose shape is complementary to the opening in the projection 120 at the rotor blade tip as the first connecting element. For actuation of the lock member 220, provided in the insert 240 is an opening 242 through which a securing element, for example a screw (FIG. 6, 130) can be brought into engagement with the one screwthread provided in the lock member. In that way—as is described in greater detail with reference to FIG. 6—the lock member can possibly be actuated from outside the rotor blade, at any event it can be secured in the locking position.

FIG. 5 shows a side view inclinedly from below showing a perspective illustration of the rotor blade body 206 and the rotor blade tip 100 according to the invention. The rotor blade body 206 has an aerodynamic profile 204 having a pressure side 204.2 and a suction side 204.1. Disposed at the end of the rotor blade body 206, that is opposite to the rotor blade tip 100, is the rotor blade root (not shown). The guide direction FR which occurs automatically due to positive guidance when making the connection is shown—in FIGS. 3a and 3b—in dotted lines, between the pins 110 as the first guide element at the rotor blade tip 100 and the sleeves 210 as the corresponding second guide element at the rotor blade body 206. Also shown is an optional seal 260 which serves for sealing off the connection in operation. The seal 260 can be an inserted separate element, but it can also be injection-molded to one or both connecting surfaces or it can be entirely omitted if the flange surfaces are of a suitable configuration.

Figure 6:
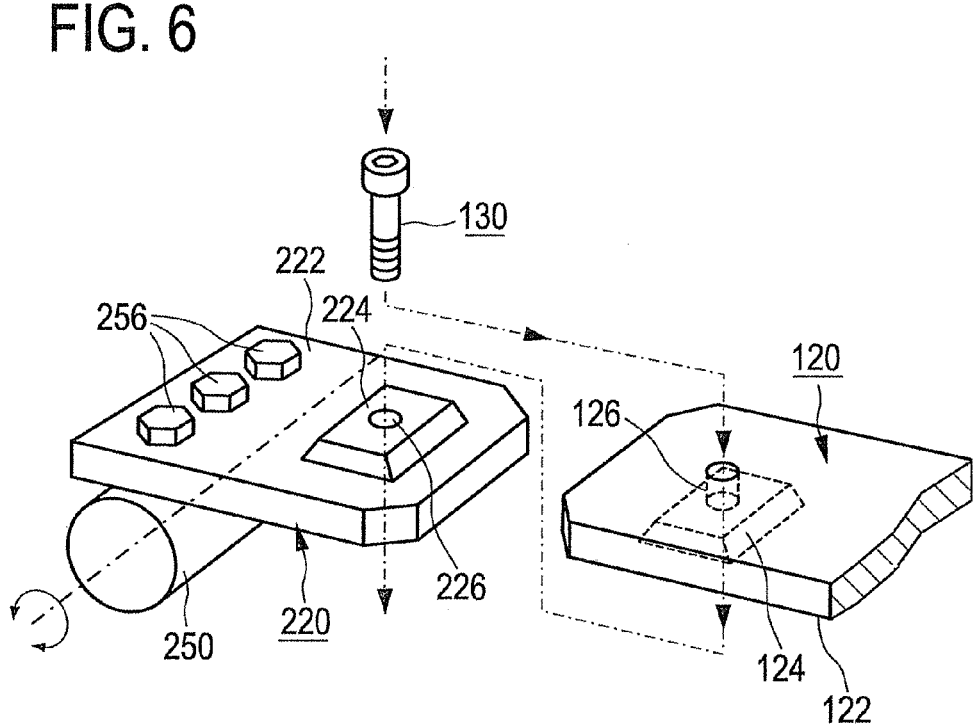
FIG. 6 shows a perspective view of the first and second locking elements of the connection between the rotor blade and the rotor blade tip.

FIG. 6 shows a perspective view in which the first and second locking elements of the connection between the rotor blade and the rotor blade tip are in the released condition, to illustrate their function.

The lock member 220 is fixed to the spindle 250 with three screws 256. As the spindle 250 is supported rotatably in the rotor blade the lock member is rotatable about the spindle 250. Disposed on the lock member 220 is a lock element 224 which in its shape precisely matches a corresponding opening 124 in the projection 120 at the rotor blade tip. That is to say the opening 124 is of a complementary shape to the lock element 224 and can thus afford a positively locking connection thereto.

To produce the locking position, that is to say to actuate the locking system, a screw 130 as a securing element—after the rotor blade tip has been fitted with the guide element to the rotor blade body—can be inserted through a bore in the rotor blade and the insert (FIG. 4, 240) in the rotor blade body. The screw then further passes first through a bore 126 as a first securing component in the projection 120 and then engages into the central bore 226 as the second securing component in the lock element 224 and the lock member 220. The bore 226 is provided with a screwthread (only indicated in the Figure) which matches the screw 130 so that rotation of the screw 130 results in the screw being screwed into the screwthread. When the screw is supported with its head against the rotor blade or the insert 240 rotation of the screw 130 leads to a movement of the lock member 220 about the spindle 250, that is to say actuation of the locking mechanism. In the locking position the opening 226 is oriented substantially perpendicularly to the guide direction FR.

To automatically bring about the locking position, that is to say to automatically actuate the locking system, the movably mounted lock member 220 can also be prestressed by prestressing means, for example at the spindle 250, into the arrangement in accordance with the locking position. Then, when the rotor blade tip is attached, the lock member 220 is deflected by the projection 120 and automatically moves back into the locking position again as soon as the lock element 224 can engage or drop back into the opening 124 in the projection 122.

The lock element 224 engages precisely into the opening 124 on the projection 120 in the locking position. In that way all forces occurring in operation of the rotor blade at the connection are transmitted by the first and second locking elements. The screw 130 as the securing element in contrast only has to secure the positively locking connection and is protected in particular from shearing forces. In that way the securing element 130 can actuate the connecting mechanism by movement of the lock member 220 and secure it in the locking position.

The described rotor blade according to the invention can be used as part of a rotor of a wind power installation for example as shown in FIG. 1.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A rotor blade tip for connecting to a rotor blade of a wind power installation, the rotor blade tip comprising:
a first connecting surface facing a direction of the rotor blade to be connected and for making the connection to the rotor blade, the connecting surface including:
first guide means having a guide direction for making the connection to the rotor blade; and
first locking means for fixing the rotor blade tip to the rotor blade when the first guide means makes the connection to the rotor blade.

2. The rotor blade tip according to claim 1 wherein the first guide means comprises at least one plug element arranged parallel to the guide direction.

3. The rotor blade tip according to claim 1 wherein the first locking means includes a projection as a first connecting element for making a releasable, positively locking connection to a corresponding second connecting element on the rotor blade.

4. The rotor blade tip according to claim 3 wherein the projection is arranged centrally on the first connecting surface and has a projection surface parallel to the guide direction.

5. The rotor blade tip according to claim 4 wherein the projection surface has at least one opening having a shape that is complementary to an opening of the second connecting element.

6. The rotor blade tip according to claim 3 wherein the first connecting element and the second connecting element each have an aperture that is perpendicular to the guide direction for receiving a securing element for securing the rotor blade tip to the rotor blade.

7. The rotor blade tip according to claim 1 wherein the rotor blade tip includes a connecting portion having an aerodynamic profile that has a pressure side and a suction side, wherein the first guide means, the first locking means, and the first connecting surface are located on the connecting portion, and wherein the rotor blade tip includes an end portion that narrows to a point at an end of the end portion, and wherein the end portion rises out of a plane defined by a surface of the connecting portion and is rotated along a central axis between about 4° and 8°.

8. The rotor blade tip according to claim 1 wherein the rotor blade tip includes a hollow metal material.

9. A wind power installation comprising:
   a rotor; and
   at least one rotor blade having a first end coupled to the rotor and a second opposite end; and
   a rotor blade tip according to claim 1 coupled to the second end of the at least one rotor blade.

10. A rotor blade for a wind power installation, the rotor blade comprising:
   a rotor blade body having a first end and a second opposite end, the rotor blade body having an aerodynamic profile having a pressure side and a suction side, a rotor blade root located at a first end of the rotor blade body, the second end including a body guide element and a body locking element; and
   a rotor blade tip including a tip guide element extending in a guide direction and configured to mate with the body guide element of the rotor blade body, and a tip locking element that is configured to align with the body locking element and removably secure the rotor blade tip to the rotor blade body, wherein the body locking element includes a lock member that is configured to releasably engage with an opening of the tip locking element of the rotor blade tip thereby removably securing the rotor blade tip to the rotor blade body.

11. The rotor blade according to claim 10 wherein the body guide element includes an aperture arranged parallel to the guide direction and is configured to receive the tip guide element of the rotor blade tip.

12. The rotor blade according to claim 10 wherein the lock member is moveably fixed to the rotor blade body and is biased to engage with the opening of the tip locking element.

13. The rotor blade according to claim 11 wherein the lock member has a lock element having a shape that corresponds to a shape of an opening in the tip locking element of the rotor blade tip.

14. The rotor blade according to claim 13 wherein the lock member has an aperture perpendicular to the guide direction for receiving the lock element.

15. The rotor blade according to claim 10 wherein the rotor blade comprises glass fiber-reinforced plastic and further comprising conductive elements that are integrated as lightening conductors in the rotor blade.

* * * * *